Fig. 1.

No. 766,594. PATENTED AUG. 2, 1904.
E. CHESHIRE.
TURBINE.
APPLICATION FILED OCT. 17, 1903.
NO MODEL. 8 SHEETS—SHEET 5.

Witnesses.
E. B. Gilchrist
J. B. Hull

Inventor.
Edward Cheshire,
By his Attorneys,
Thurston & Bates

No. 766,594. PATENTED AUG. 2, 1904.
E. CHESHIRE.
TURBINE.
APPLICATION FILED OCT. 17, 1903.
NO MODEL. 8 SHEETS—SHEET 6.

Witnesses.
E. B. Gilchrist
J. B. Hull.

Inventor.
Edward Cheshire,
By his Attorneys,
Thurston & Bates.

Patented August 2, 1904.

UNITED STATES PATENT OFFICE.

EDWARD CHESHIRE, OF MILWAUKEE, WISCONSIN.

TURBINE.

SPECIFICATION forming part of Letters Patent No. 766,594, dated August 2, 1904.

Application filed October 17, 1903. Serial No. 177,368. (No model.)

*To all whom it may concern:*

Be it known that I, EDWARD CHESHIRE, a citizen of the United States, residing at Milwaukee, in the county of Milwaukee and State of Wisconsin, have invented a certain new and useful Improvement in Turbines, of which the following is a full, clear, and exact description, reference being had to the accompanying drawings.

My invention relates to compound or multi-expansion turbines, and has for its object the construction of a turbine of this type which shall be compact, of slow speed, and of high thermal efficiency; which shall have small clearance other than the necessary passage for steam; which shall maintain a proper balance of fluid-pressure, and which shall utilize to the best advantage the impact and reaction on the blades and buckets due to the expansion of the steam or other pressure fluid. It may be further described as consisting generally of the combinations of elements set forth in the claims hereto appended.

Referring to the drawings.

Describing the parts by letters, the turbine consists generally of three portions—viz., the outside shell or casing A, the stationary member B, and the movable member C.

The outside shell or casing consists of two oppositely-disposed side webs $a\ a$ and an intermediate annular portion $b$, said side webs and intermediate portion being clamped together, as by screw-bolts D, passing through said webs near the peripheries thereof. The intermediate portion supports the weight of the turbine by means of the feet or brackets $b'$. Each of the side webs is cored out to form a chamber $a'$, into which water may be introduced to condense the steam as it issues from the lowest pressure chamber or cylinder of the turbine and at the same time keep cool the main bearings. As shown, the water-chamber is so constructed as to discharge the water in a sheet or an annular row of jets across the path of the escaping steam, the water and condensed steam escaping through the exhaust-port $a^2$. The side portions carry the bearings $a^3$ for the turbine-shaft, which bearings are provided with ducts $a^4$ for a system of forced-feed lubrication. The details of the condenser and lubricator system form no part of the invention covered by this application and need no further description herein.

The central portion of the casing is provided with a connection $b^2$ for the admission of steam to the turbine and also with a tubular connection $b^3$ for the governing apparatus which controls the flow of steam to the turbine in accordance with the speed of the same. This governing apparatus forms no part of the invention covered by this application, but constitutes the subject-matter of my application, Serial No. 175,315, filed October 1, 1903.

The stationary member of the turbine consists of a central annular core $b^4$, cast with or otherwise carried by the intermediate portion of the casing. As shown, this core is made hollow to dispense with unnecessary weight, there being a number of radial ribs $b^5$ extending across the hollow portion of the core, the purpose of which will be hereinafter explained. The governor-valve and its stem are located in this core, as shown at $b^6\ b^7$. The purpose of this core is to support a number of stationary rings carrying blades or buckets which coact with a number of movable blade-carrying rings forming part of the movable members, to be described hereinafter.

Figure 1:
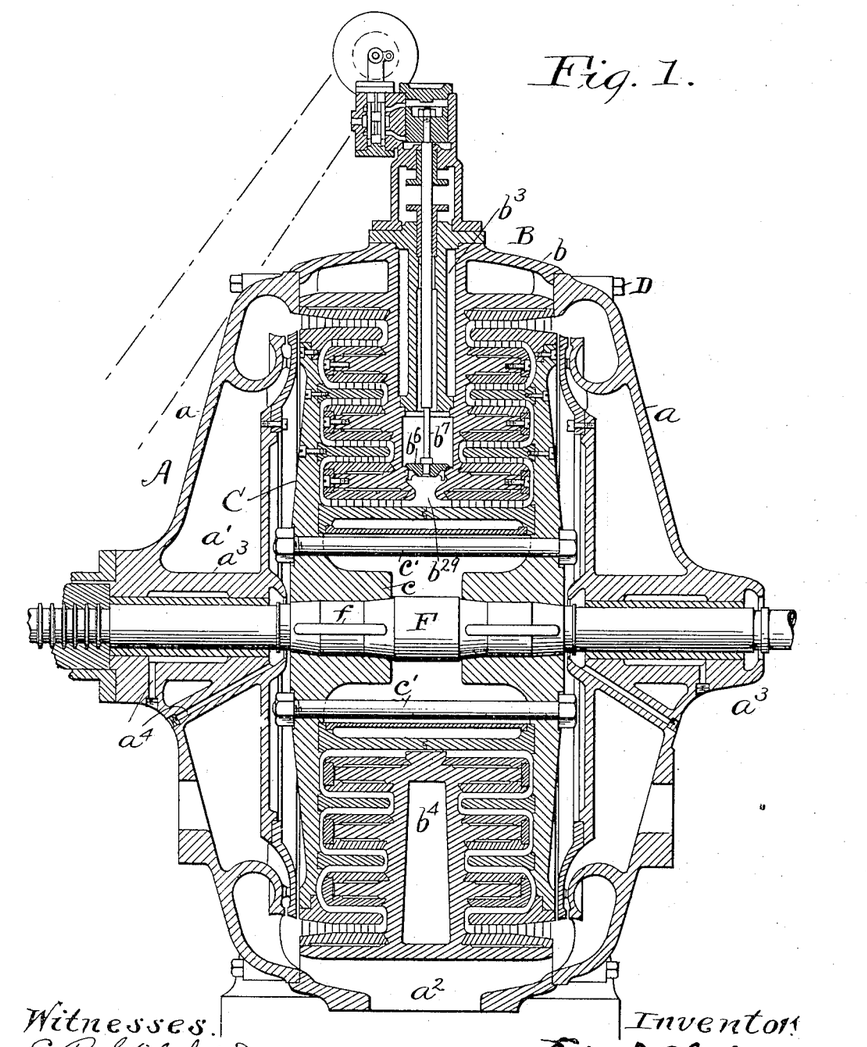
Figure 1 represents a vertical sectional view of the turbine.

The movable members of the turbine consist of the two opposed disks C, to which runner-rings are secured. These disks are provided each with an inwardly-projecting hub $c$, the inner portion of the hub tapering to conform to the taper of the shaft F, to which it is keyed, as shown at $f$, Fig. 1. The disks are held in position on the shaft by means of through-bolts $c'$. The function of these disks is to form a support for the runner-rings and to transmit the rotary movement of the same to the shaft.

The details of construction of the stationary and runner rings will now be described. The two sides of the turbine being substantially identical, a description of one side will be amply sufficient for the purpose of a complete understanding of the invention.

Figure 21:
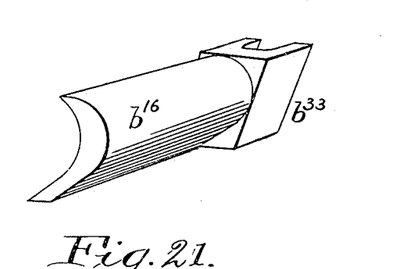
Figure 22:
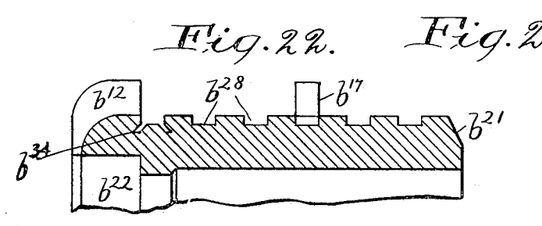
Figs. 22 and 23 represent sectional details of two of the fixed rings.
Figure 23:
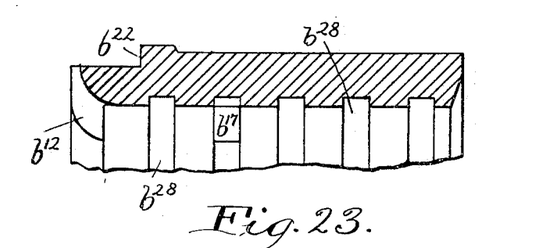

The core is provided with a series of concentric annular ribs $b^8$, to which are secured the stationary rings $b^9$ $b^{10}$. These rings, as shown, are secured to the opposite peripheries of the ribs, there being no ring on the outer periphery of the outermost rib. The ribs are spaced apart sufficiently to allow proper clearance between the stationary rings and the blades of the runner-rings $c^2$. While the blades on the fixed and runner rings are constructed in the same manner and in nearly all cases are of the same size, to distinguish between those on the fixed rings and those on the movable or runner rings the former will be hereinafter designated as "buckets," though the term "blades" will be used broadly to include both the fixed and the movable blades. The rings secured on the inner peripheries of the ribs $b^8$ will be hereinafter designated as "inner" rings and those secured on the outer peripheries thereof as "outer" rings. Each inner ring except the outermost, $b^{11}$, is provided with an inwardly-projecting flange $b^{12}$, which extends beyond the end of its rib to a position nearly in contact with the disk C. Each outer ring is provided with a similar outwardly-projecting flange $b^{13}$. For a certain portion of its extent, however, the laterally-projecting portion of each of the flanges is removed and the portion adjacent to the disk corresponding to said flangeless portion is cut down a short distance, as for one-eighth of an inch, as shown at $b^{14}$ $b^{15}$, Figs. 4 to 9, for a purpose to be hereinafter described. The rings are provided with a number of channels $b^{28}$, adapted to receive the buckets $b^{16}$. As the buckets in all but the last or outermost ring do not entirely fill the grooves or channels provided for their reception, the space between the ends of each row of buckets is provided with a filler-ring $b^{17}$, such filler-rings extending into close proximity to the body portions of the adjacent movable rings and forming between the ends of said rings and such body portion a chamber for the steam. The buckets and blades are secured in the grooves in their respective members, as by means of legs $b^{33}$, adapted to be fitted into diverging extensions $b^{34}$ of the grooves $b^{28}$. (See Figs. 21 and 22.) The details of the blades and their manner of attachment to their respective members form no part of the invention covered by this application, but constitute the subject-matter of my application, Serial No. 175,316, filed October 1, 1903.

Figure 3:
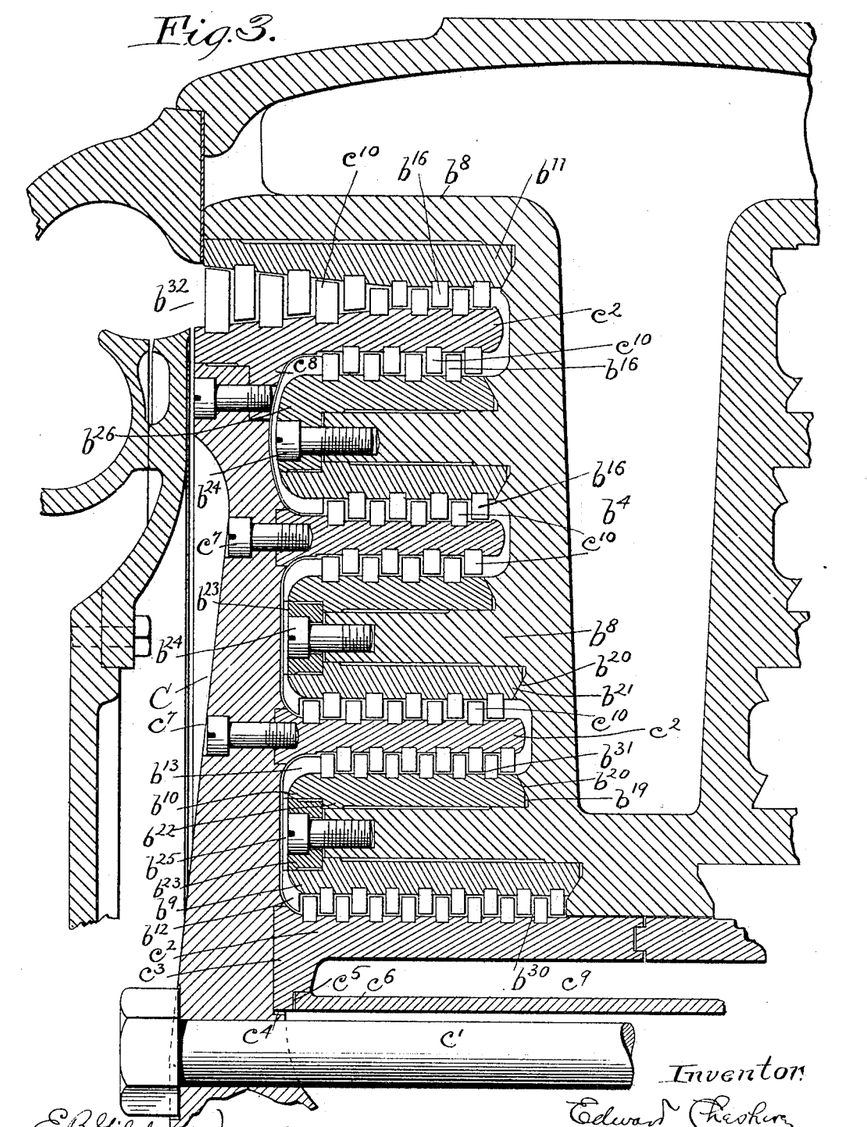
Fig. 3 represents an enlarged sectional view of a portion of the turbine.
Figure 4:
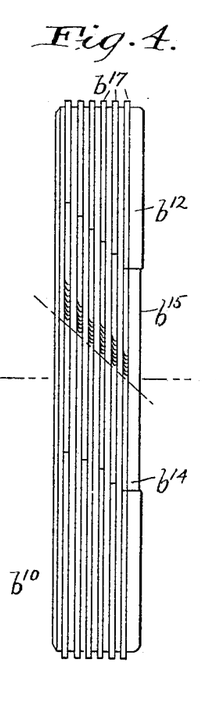
Figs. 4, 5, and 6 represent side elevations of the rings secured to the outer peripheries of the annular ribs shown in Fig. 3.
Figure 5:
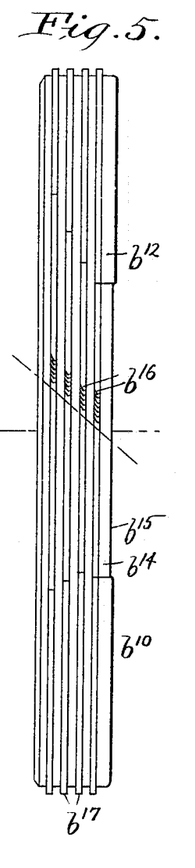
Figure 6:
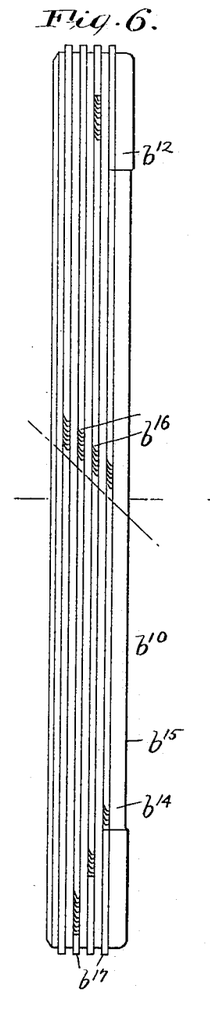
Figures 7, 9, 10:
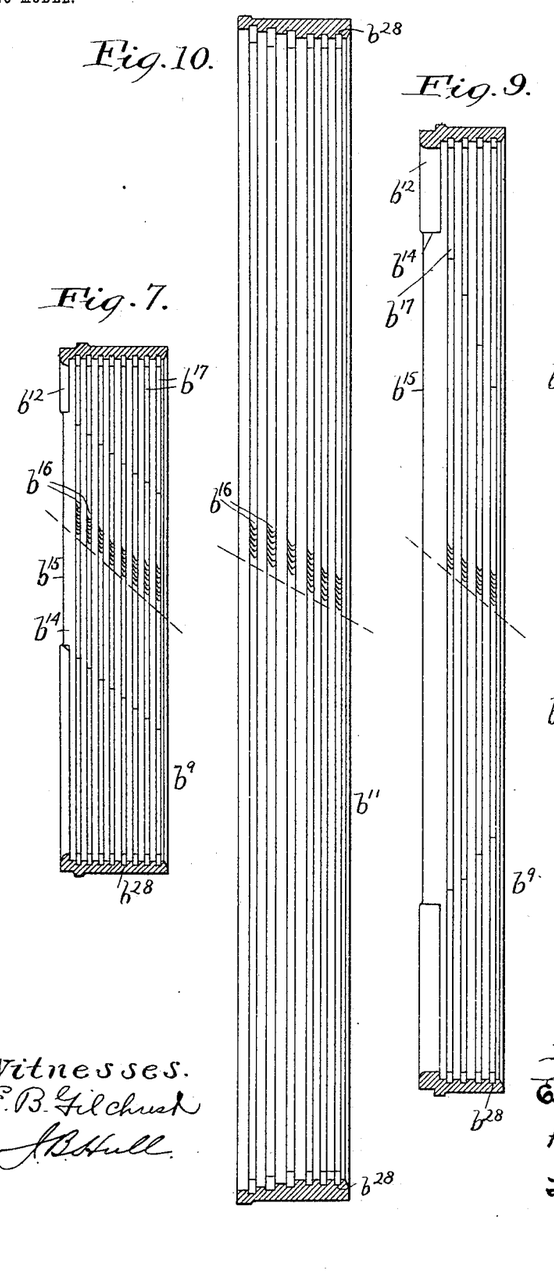
Figs. 7, 8, 9, and 10 represent developed halves of the rings secured to the inner peripheries of such annular ribs, said rings being shown in section.
Figure 8:
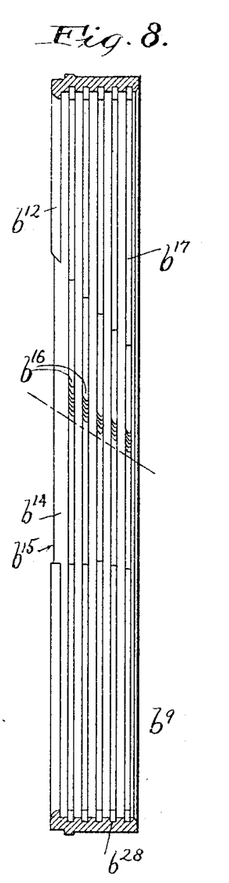
Figure 11:
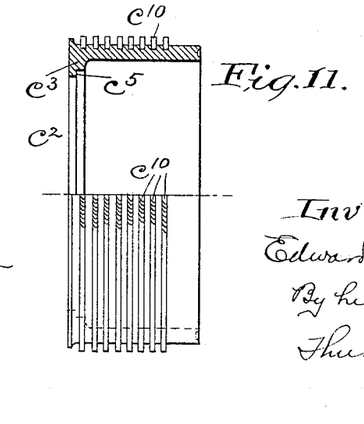
Figs. 11, 12, 13, and 14 represent the movable or runner rings, said rings being shown half in section and half in elevation.
Figure 12:
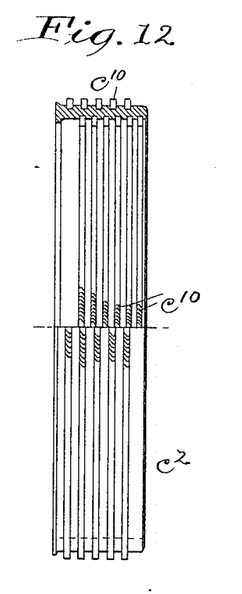
Figure 13:
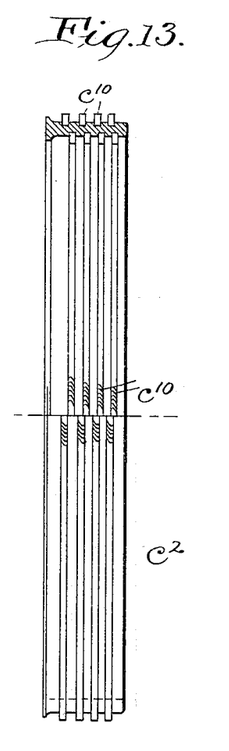
Figure 14:
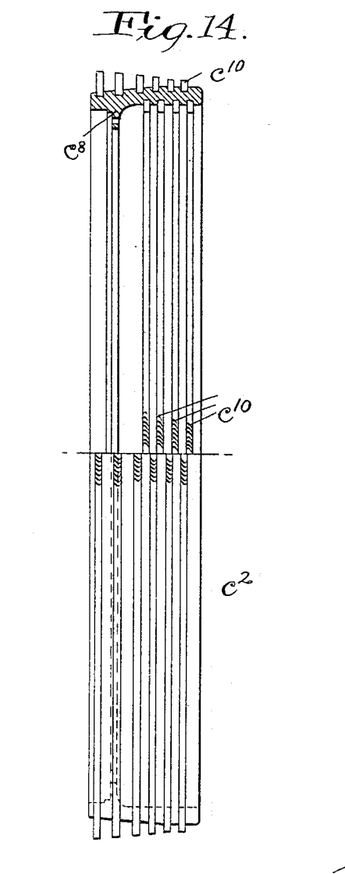

The fixed rings are secured in place as follows: Adjacent to each side of the ribs the core is provided with channels $b^{19}$, the channels having each a portion $b^{20}$, beveled toward the rib. Each ring is provided with a beveled portion $b^{21}$, adapted to seat against the beveled portion of the channel, whereby the rings are held firmly in place. The outer ends of the rings—those adjacent to the disk C—are provided with shoulders $b^{22}$, which bear against and project slightly beyond the outer edges of the ribs. In order to force the rings into their seats in the channels and to secure them in place, intermediate clamping-rings $b^{23}$ are employed, said rings fitting between the outer portions of a pair of inner and outer rings and resting on the shoulders of the same. Screw-bolts $b^{24}$, passing through the clamping-rings and fitting into threaded recesses in the ribs, draw said rings against the shoulders and retain the inner and outer rings in place. These clamping-rings are cut away, as shown at $b^{25}$, Fig. 3, corresponding to the cut-away portions of the ring-flanges, for a purpose to be hereinafter set forth.

As a modification of the clamping means above described the outer ring of the third pair of stationary rings has formed therewith a deep lateral flange $b^{26}$, which overlaps the edge of the rib, bears against the shoulder $b^{22}$ of the corresponding inner ring, and in connection with the screw-bolts $b^{24}$ serves the same function as the clamping-ring employed with the two inner sets of rings. The outermost fixed ring, as is the case with the other fixed rings, is provided with a beveled surface fitting against a corresponding beveled surface in the channel. The outer edge of said ring bears against the side web of the casing, the screw-bolts which clamp the opposite side webs to the central member serving to hold the ring in place.

The runner-rings, with the exception of the innermost ring, are secured to the webs in such position as to project between the inner and outer fixed rings, with their blades just clearing such fixed rings. The innermost runner-ring has no stationary ring interior thereto. This ring and the corresponding ring on the other side of the turbine are provided each with a shouldered portion $c^3$, fitting into a channel $c^4$ in its corresponding disk, said shouldered portion having therein a step $c^5$ for receiving the cylinder $c^6$. The meeting edges of these runner-rings are provided the one with a mortise, the other with a tenon, whereby they form, in effect, a continuous ring between the disks, being held in place by the through-bolts $c'$. The next two runner-rings are provided with shoulders fitting in channels in the disk C, in which they are secured by screw-bolts $c^7$. The outermost runner-ring bears against the periphery of the disk and is secured in place by screw-bolts passing through the outer portion of the disk and a shoulder $c^8$ on the ring. The construction and relative sizes of these rings appear in Figs. 11 to 14.

Figures 15, 16, 18:
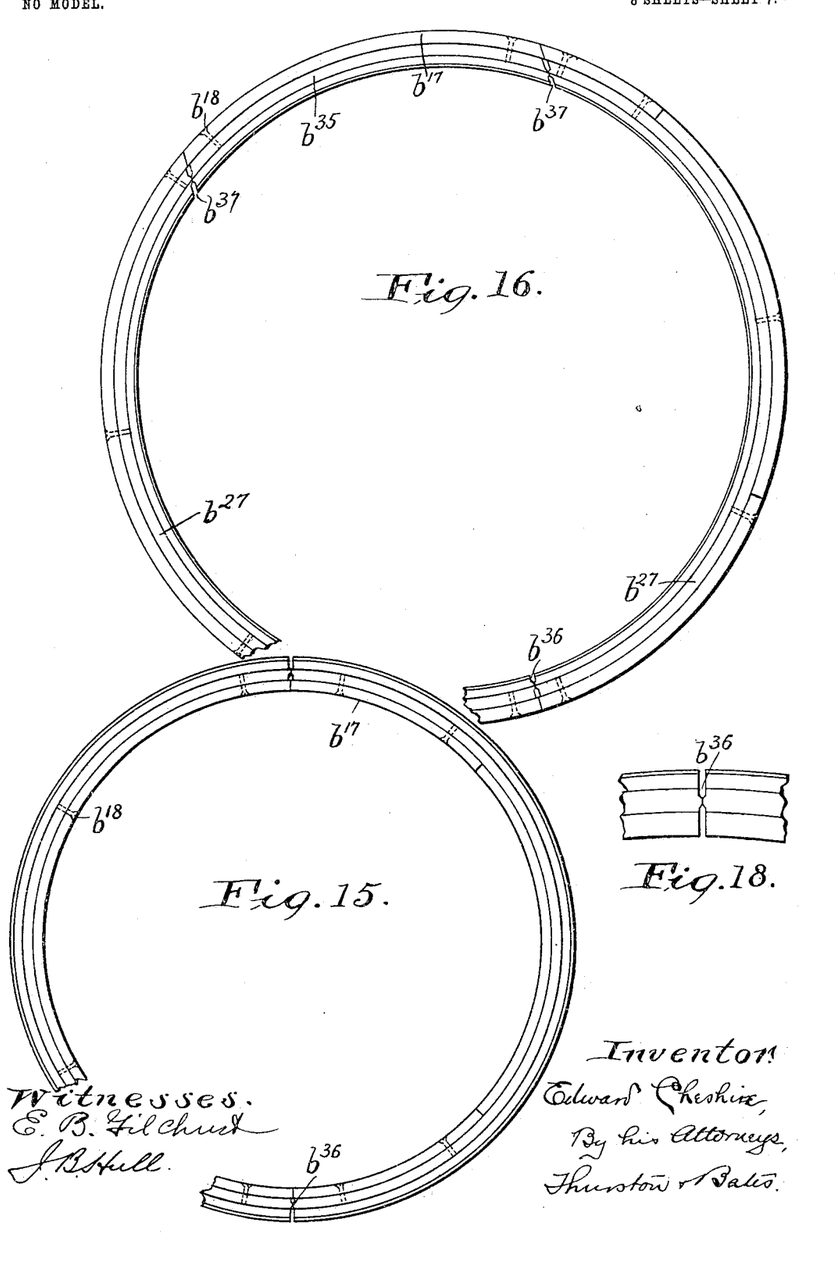
Figs. 15 and 16 represent end elevations of two of the fixed rings.
Fig. 18 is a detail showing the manner of assembling the fixed rings.
Figure 19:
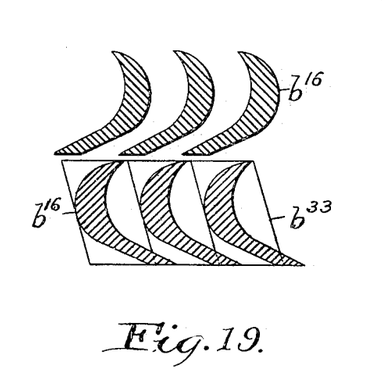
Fig. 19 is a sectional detail showing the relative arrangement of the fixed and movable blades.
Figure 20:
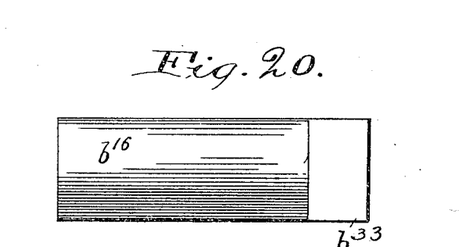
Figs. 20 and 21 are respectively a side elevation and a perspective view of one of the blades.

For convenience in assembling the fixed rings are made in parts, each outer ring being made in two parts and each inner ring in three parts, as shown in Figs. 15 and 16, respectively. As illustrated in the latter figure, the inner ring is composed of two large portions $b^{27}$ and a smaller portion $b^{35}$. The cut $b^{36}$ between the two large portions is shown as radial, while the cuts $b^{37}$ between the large portions and the smaller portion are inclined to the radius and parallel with each other. By this construction the inner ring is easily assembled. The large portions being slipped in place within their annular rib, the small portion may be easily slid in place, the ring then being secured in position by means of its clamping-ring, as hereinbefore described. The cuts through the outer ring are radial, as shown in Fig. 15. The ring $c^6$, bearing against the shoulders of the innermost pair of runner-rings $c^2$, provides an air or other insulating space $c^9$ between the steam chambers or cylinders of the turbine and the shaft F and through-bolts $c'$, whereby the radiation of heat to said shaft and bolts is minimized.

In order to utilize in the most advantageous manner the expansion of the steam and to obtain the greatest possible thermal efficiency therefrom, I have in the embodiment of my invention herein disclosed further constructed the stationary rings as follows: Each of such rings except the outermost is provided throughout a portion only of its extent with buckets. These buckets are set in rows extending at right angles to the axis of the ring and at right angles to the shaft of the turbine, said rows being spaced sufficiently to permit the passage therebetween without unnecessary clearance of the corresponding rows of blades on the movable or runner rings.

To confine the steam in its passage through each stationary ring or the turbine-chamber formed between each of such rings and its corresponding runner-ring and cause it to follow the path of least resistance through the turbine, the space between the ends of each row of buckets is provided with a filler-ring $b^{17}$. The filler-rings are fitted into grooves $b^{28}$ in the inner and outer peripheries of the inner and outer stationary rings, respectively, being secured therein, as by screw-bolts $b^{18}$. When in position, their free edges are in close proximity to their corresponding runner-rings, thereby practically confining the steam to the bucket-carrying portions of the stationary rings. The construction and arrangement of the stationary and clamping rings and the arrangement of the rows of buckets on the various stationary rings, whereby the steam or other pressure fluid is permitted to expand progressively from the inner or central portion of the turbine to the outlet therefrom, will now be described.

The steam, as will be observed, is admitted to the interior of the turbine through the governor-valve $b^6$. Thence it passes downwardly and inwardly to the chamber $b^{29}$, whence it flows to the two opposite sides of the turbine. Following the course of the steam on the left-hand side of the turbine, Fig. 3, it will be seen that it passes through the turbine-chamber $b^{30}$, thence upwardly and outwardly into the chamber $b^{31}$, and so on until it reaches the discharge-outlet $b^{32}$. While the flow of the steam through any stationary ring is generally axial with respect thereto, the rows of buckets on such rings are not in exact axial alinement, but overlap one another progressively in such manner as to cause the steam to take the path of least resistance therethrough.

The path of least resistance between any stationary and runner ring is at an angle to the axes of said rings, such angle being in the direction of rotation of the runner-rings, and where filler-rings are necessary the path between them is provided as nearly as possible along said path of least resistance, as will appear more particularly in Figs. 4 to 10.

Figures 2, 17:
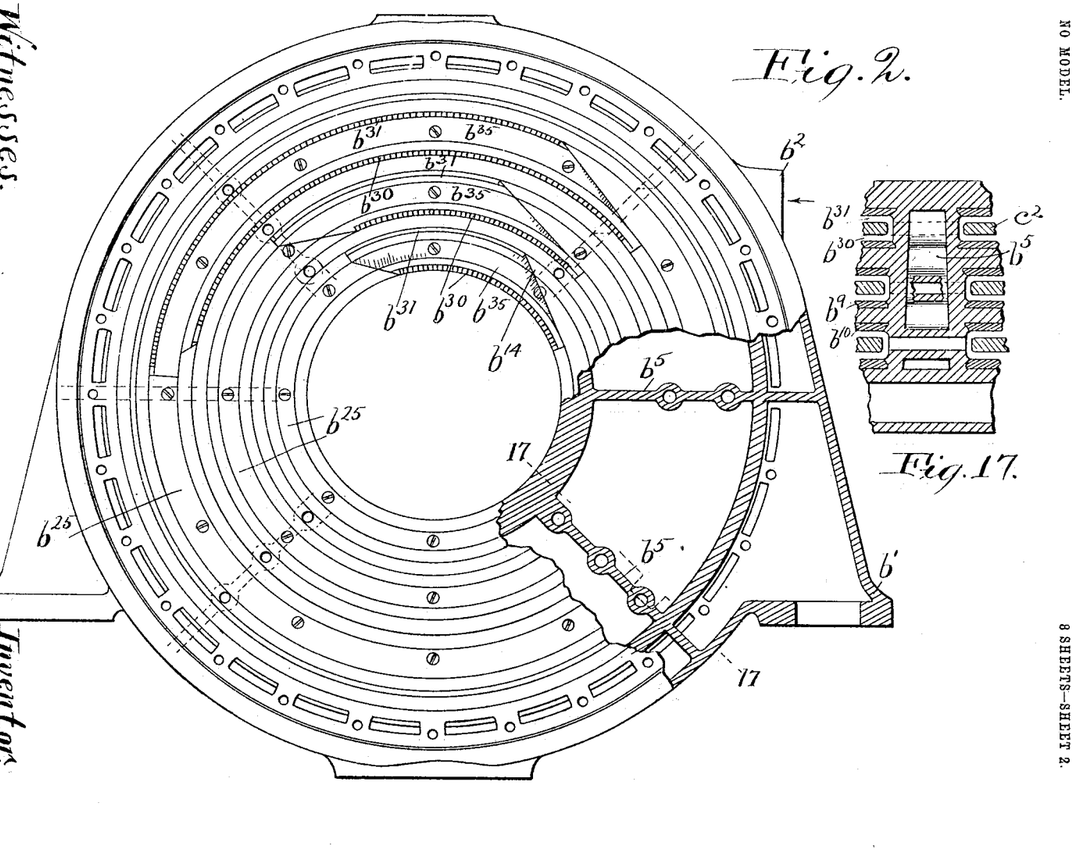
Fig. 2 represents a side elevation of the same with parts removed to show the internal construction.
Fig. 17 is a sectional detail showing the manner of balancing the fluid-pressure on opposite sides of the turbine.

Owing to the fact that the steam as it leaves any of the turbine-chambers impinges against and is discharged from the last row of blades on the runner-ring, the path of least resistance for such steam in passing from one turbine-chamber to the other is at an angle to the axes of such rings, such angle being contrary to the direction of rotation of the runner-rings. In order to permit the steam to follow the path of least resistance from one turbine-chamber to another, the central portions of the inlets to the turbine-chambers $b^{31}$ are not in radial alinement with the central portions of the outlets from the preceding chambers $b^{30}$, and a channel corresponding as nearly as possible to this path of least resistance is formed between the opposing walls of the flanges and cut-away portion of the clamping-ring, as shown in Fig. 2. The number of buckets in each row varies not only in the different rings, but in all except the first or innermost ring in the different rows of the same ring. The free section thus formed between the ends of the filler-rings increases generally from the entrance to the first row of buckets to the last row of buckets in each fixed ring throughout the turbine and at any stage, is a function of the specific volume and velocity of the steam or other elastic pressure fluid.

As will appear more particularly in Figs. 4 to 10 in the embodiment of my invention under consideration, the free section through any fixed ring increases progressively from the innermost ring to the outermost ring. Passing from the innermost chamber of the turbine to the outermost chamber this free section increases progressively from chamber to chamber, attaining its maximum capacity in the outermost chamber wherein the free section is substantially coextensive with the circumference of the outermost fixed ring from the entrance to the outlet from said ring.

At any stage of expansion of the steam the blades and buckets will have their sectional dimensions and length increased, as well as their angle of entrance and outlet designed to suit the conditions of volume and speed of the steam at such stage of expansion.

It will be observed that the chamber formed between the last stationary ring and its interiorly-arranged runner-ring extends outwardly from a point about one-third of the distance between the inner and the outer portion thereof. This outwardly-extending arrangement may extend back similarly throughout the last stage of expansion and may even be employed in the second and third stages from the outlet for larger power-turbines.

The object of the flanges with which the fixed rings are provided is to restrict clearance, and the removal of a portion of such flanges and a cutting away of the portion of the outer end of each of said rings in line with this flangeless portion permit the steam to flow from one turbine-chamber to another through a passage adapted to accommodate the progressive expansion of the steam. In the rings in which the flange is adjacent to the outlet the flange is cut away, so that one wall thereof overlaps the end of the last row of buckets in the same manner that one end of said row overlaps its preceding row. In the rings wherein the flange is adjacent to the inlet the end walls of the flange are in axial alinement with the ends of the first row of buckets. In the one case this arrangement accommodates the progressive expansion of the steam in its chamber. In the other case it provides a guide for the steam from one chamber to the other.

Projecting from the inner and outer peripheries of the movable or runner rings $c^2$ are rows of blades $c^{10}$, said rows alternating with the rows of buckets on the fixed rings, the blades extending into the spaces between the rows of buckets and the filler-rings and the parts being so proportioned that only sufficient clearance is provided to permit the free movement of the blades past the bodies of the stationary rings, there being, however, considerable clearance between the sides or edges of the blades and the buckets and between the sides or edges of said blades and the filler-rings.

The blades and buckets are preferably of the construction shown in my application Serial No. 175,316, hereinbefore referred to, wherein the details of said blades are fully disclosed and claimed. These blades are of the same size as the coacting buckets, except that those in the last three rows of the outermost runner-ring are slightly longer and wider than their corresponding buckets. This is made necessary by the location of the blades exteriorly to the buckets in the expanding outlet-chamber and by the necessity of having the tips of said blades extend as closely as possible to the wall of the stationary ring. As will be observed, the tips of the blades and buckets in the expanding portion of this chamber are beveled or inclined to correspond to the incline of the wall of the ring adjacent thereto, thereby avoiding unnecessary clearance.

The blades and buckets must be set so that the runners may rotate in the desired direction. As shown, these parts are so arranged as to cause a rotation toward the steam-inlet connection in the intermediate wall of the casing. This arrangement, however, is not material.

While the invention has been described mainly with reference to but one side of the turbine, such description is applicable to the other side, it being only necessary to reverse the direction given to the steam in its passage through the stationary rings and to reverse the arrangement of blades and buckets. As has been indicated hereinbefore, the two innermost opposite chambers or cylinders are in free communication, thereby insuring a balance of steam-pressure in said chambers. This should also insure a balance in the remaining opposite chambers or cylinders; but to provide against any disturbance of this balance by unsuspected causes, such as imperfect construction, holes are drilled through the core and the radial ribs $b^5$, as shown in Figs. 2 and 17, thereby placing the inner connecting-passages of opposite chambers in communication and balancing the pressure in said chambers.

From the foregoing description it will be apparent that my turbine is constructed to permit an axial flow of steam through the different chambers thereof and a radial outward flow of steam from the inner or central portion to the outer portion thereof, that with the exception of the innermost chamber these chambers increase in area from the inlet to the outlet thereof, and that the areas of the chambers increase radially and progressively from the innermost to the outermost chamber. By this construction I have provided means for utilizing a large percentage of the expansive effect of the steam and have produced a turbine combining great economy and efficiency of operation at low rotative speeds.

The foregoing detailed description has proceeded on the assumption that with certain dimensions of parts the turbine shall not operate at its maximum capacity. If greater power were desired from a turbine of substantially the same pattern running at the same speed, the free section through the turbine-chambers would be increased correspondingly and the length of the filler-rings and of the lateral flanges would be correspondingly reduced with a corresponding increase in the length and spacing of the blades and buckets, commencing at the exhaust or last row and carrying back such increase in length and spacing to other rows and chambers to provide the necessary free section to accommodate the proper volume and velocity of the steam. Should the maximum power obtainable from a turbine of substantially the same pattern and at the same speed be desired, no filler-rings nor lateral flanges would be employed. The greatest economy is reached when the necessary volume of steam passing through the turbine permits the entire disuse of filler-rings.

While I have described my invention in detail, such details may be departed from or varied more or less without departing from the spirit of my invention, and I do not limit or confine myself to such details, except as they may be positively included in the claims. For instance, while I have shown and described the innermost turbine-chamber as having a free section of uniform width throughout I do not limit myself to such uniform width, as the steam may be permitted to expand somewhat in its passage through this chamber without any material decrease in efficiency.

While for convenience in description I have generally referred to steam as the pressure fluid employed in my apparatus and while this fluid will generally be employed, it is evident that any other pressure fluid may be employed in lieu thereof, and I do not limit myself to its use.

Having described my invention, I claim—

1. In a turbine, the combination of a hollow core, said core having an annular rib thereon, a peripheral row of blades carried by said rib, a ring concentric with said rib and provided with a peripheral row of blades coöperating with the row of blades carried by said rib, and means for supplying pressure fluid through said hollow core to the space between said rib and ring, substantially as described.

2. In a turbine, the combination of a hollow core, said core having concentric annular ribs thereon, peripheral rows of blades carried by said ribs, a member exterior to said core and provided with rings, peripheral rows of blades on said rings coöperating with the rows of blades carried by said ribs, and means for supplying pressure fluid through said hollow core to the spaces between said ribs and rings, substantially as described.

3. In a turbine, the combination of a casing, a central hollow annular core carried thereby, said core having concentric annular ribs thereon, fixed rings carried by said ribs and provided with peripheral rows of buckets, runner-rings in said casing provided with peripheral rows of blades coöperating with said rows of buckets, and means for supplying pressure fluid through said hollow core to the spaces between said ribs and rings, substantially as described.

4. In a turbine, the combination of a casing, a central annular core carried thereby, said core having concentric annular ribs thereon, fixed rings secured to the inner and outer periphery of each of said ribs and carrying rows of buckets, and runner-rings in said casing provided with rows of blades, said runner-rings extending into the spaces between the stationary rings, substantially as described.

5. In a turbine, the combination of a casing, a central annular core carried by said casing and provided on each face thereof with concentric annular ribs, stationary rings secured in pairs to the inner and outer periphery of each of said ribs and provided with peripheral rows of buckets, a movable disk on each side of said core, movable or runner rings carried by said disks and projecting into the space between the stationary rings, and peripheral rows of blades carried by said runner-rings adapted to coöperate with said rows of buckets, substantially as desired.

6. In a turbine, the combination of a casing, a shaft carried by and extending through said casing, a fixed member within said casing provided with rings each carrying rows of buckets extending only partly around the periphery thereof, filler-rings connecting the opposite ends of each row of buckets, a disk within the casing secured to said shaft and provided with movable or runner rings each having continuous peripheral rows of blades adapted to coöperate with the rows of buckets, substantially as described.

7. In a turbine, the combination of a casing, a shaft carried by and extending through said casing, a centrally-arranged fixed member within said casing provided on its opposite faces with rings each carrying rows of buckets extending only partly around the periphery thereof, filler-rings connecting the opposite ends of each row of buckets, and a disk within the casing on each side of said fixed member, secured to said shaft and provided with movable or runner rings each having continuous rows of blades coöperating with the rows of buckets on the fixed rings, substantially as described.

8. In a turbine, the combination of a casing, a centrally-arranged fixed member within the same, concentric annular rings carried by the two opposing faces of said fixed member, peripheral rows of buckets carried by each of said rings, said rows extending only partly around the peripheries of said rings, means for filling the space between the ends of each row of buckets, disks within said casing one on each side of said fixed member and provided with concentric annular runner-rings extending into the spaces between said fixed rings and each provided with rows of blades coacting with the rows of buckets on the fixed rings, there being channels formed between said disks and the outer edges of the fixed rings, a central chamber within the fixed member adapted to discharge pressure fluid in opposite directions into the chambers between the two opposite innermost fixed rings and the corresponding runner-rings, whereby the steam is caused to flow alternately axially and radially to the discharge-outlet of the turbine, substantially as described.

9. In a turbine, the combination of a casing, a central fixed member within the casing provided on opposite faces thereof with concentric annular fixed rings, peripheral rows of buckets carried by said rings, disks within said casing, one on each side of said central portion, provided with concentric annular runner-rings each carrying peripheral rows of blades, said runner-rings extending into the spaces between the fixed rings with the rows of blades alternating with the rows of buckets, means for supplying pressure fluid to the central portion of the fixed member and thence to the two opposite chambers formed between the opposite innermost fixed rings and their cooperating runner-rings, and means for permitting said fluid to flow alternately axially and radially to the discharge-outlet of the turbine, substantially as described.

10. In a turbine, the combination of a casing, a central, hollow, fixed member within the casing provided on opposite faces thereof with annular fixed rings provided with buckets, disks within said casing one on each side of said central portion, provided with blade-carrying runner-rings, said runner-rings projecting into the spaces between the fixed rings, and radial ribs extending across the hollow portion of the fixed member and provided with passages placing in communication the spaces between the fixed rings, whereby the pressure on opposite sides of the turbine is equalized, substantially as described.

11. In a turbine, the combination of a central fixed member provided with bucket-carrying rings extending from each side thereof, a movable member on each side of said central fixed member having runner-rings projecting into the spaces between the fixed rings, and means for equalizing the pressure between the above-mentioned spaces on one side of such fixed member and the corresponding spaces on the opposite side of said member, substantially as described.

12. In a turbine, the combination of a central fixed member provided with bucket-carrying rings extending from each side thereof, a movable member on each side of said central fixed member having runner-rings projecting into the spaces between the fixed rings, turbine-chambers being formed between said fixed and runner rings, means for supplying pressure fluid to both sets of chambers, and means for placing in communication the corresponding chambers on the opposite sides of said fixed member whereby the pressures on both sides of said member are equalized, substantially as described.

13. In a turbine, the combination of independent sets of fixed rings provided with buckets, independent sets of runner-rings projecting into the spaces between the fixed rings and forming turbine-chambers therewith, and means for equalizing the pressure between the corresponding chambers of said sets, substantially as described.

14. In a turbine, the combination of two independent sets of turbine-chambers, and means for equalizing the pressure between any chamber of one set and the corresponding chamber of the other set, substantially as described.

15. A turbine having, in combination, two symmetrical independent sets of turbine-chambers, and connections between any chamber of one set and the corresponding chamber of the other set, whereby the pressures in said chambers are equalized, substantially as described.

16. In a turbine, the combination of two independent sets of turbine-chambers arranged to permit an outward radial flow of pressure fluid, means for supplying pressure fluid from a common source to the innermost chamber of each set, and means for equalizing the pressure between any of the other chambers of one set and the corresponding chamber of the other set, substantially as described.

17. In a turbine, the combination of two independent symmetrical sets of turbine-chambers concentrically arranged, an interior chamber for pressure fluid communicating with the innermost turbine-chamber of each set, and means for establishing communication between any of the other turbine-chambers of one set and the corresponding turbine-chamber of the other set, substantially as described.

18. In a turbine, the combination of a central hollow member having on its opposite faces symmetrically-arranged rings, a member on each side of said central member having rings projecting into the spaces between the rings on the central member and forming therewith turbine-chambers, and ribs extending across the hollow portion of said central member and provided with passages adapted to establish communication between the chambers on one side of said central member and those on the other side thereof, substantially as described.

19. In a turbine, the combination of a central hollow cylindrical member having on its opposite faces symmetrically-arranged concentric rings, a member on each side of said central member having concentric rings projecting into the spaces between the rings on the central member and forming therewith turbine-chambers, and ribs extending across the hollow portion of said central member and provided with passages adapted to establish communication between the chambers on one side of said central member and the corresponding chambers on the other side thereof, substantially as described.

20. In a turbine, the combination of a series of fixed rings, each of said rings being provided with a plurality of rows of buckets, each of said rows occupying only a portion of the periphery of its ring, means for filling the space between the ends of each row of buckets, a series of runner-rings, each of said runner-rings being provided with rows of blades coöperating with said rows of buckets, the arrangement of parts being such that the area of the passage for the pressure fluid between each of said fixed and runner rings is restricted to a portion only of the annular space formed therebetween, said passage increasing progressively in area throughout the successive spaces from the inlet to the outlet of the turbine, substantially as described.

21. In a turbine, the combination of a series of fixed rings having rows of buckets on a portion only of their peripheries, of a series of blade-carrying runner-rings projecting into the spaces between the fixed rings and forming turbine-chambers therewith, and means for filling the space between the ends of each row of buckets, the width of the bucket-provided portion of each fixed ring progressively increasing from the inlet to the outlet of the turbine, whereby the pressure fluid is permitted to expand progressively in its passage therethrough, substantially as described.

22. In a turbine, the combination of a fixed member provided with rings each having on its periphery a series of rows of buckets extending only partly around the same, means for filling the space between the ends of each row of buckets, and runner-rings provided with blades and projecting into the spaces between the fixed rings and forming turbine-chambers therewith, the width of the bucket-provided portion of each fixed ring progressively increasing from the inlet to the outlet of the turbine, whereby the pressure fluid is permitted to expand progressively in its passage through the chambers of the turbine, substantially as described.

23. A ring for turbines having a row of buckets extending only partly around the periphery thereof, and a lateral flange projecting from one edge of said ring having a cut-away portion corresponding to the bucket-provided portion of the ring, substantially as described.

24. A ring for turbines having a row of buckets extending only partly around the periphery thereof, means for filling the space between the ends of said row, and a lateral flange projecting from one edge of said ring having a cut-away portion corresponding to the bucket-provided portion of the ring, substantially as described.

25. A ring for turbines having a series of rows of buckets each extending only partly around the periphery thereof, the said rows overlapping one another progressively at one end thereof, means for filling the spaces between the ends of each row of buckets whereby a passage for pressure fluid is provided through said rows of buckets, a lateral flange at one edge of said ring, said flange and the edge of said ring being cut away so as to form a continuation of the fluid-passage through said rows of buckets, substantially as described.

26. A ring for turbines having a series of rows of buckets each extending only partly around the periphery thereof, said rows overlapping one another progressively at one end thereof, filler-rings extending around the periphery of said ring between the ends of each row of buckets, whereby a passage for pressure fluid is formed through said rows of buckets, and a lateral flange at one edge of said ring having a portion cut away, one end of said cut-away portion overlapping the corresponding end of its adjacent row of buckets whereby said cut-away portion forms a continuation of the passage through said rows of buckets, substantially as described.

27. In a turbine, the combination of a ring-supporting member provided with a laterally-projecting rib, a ring for said member, and means for securing said ring to a lateral face of said rib, substantially as described.

28. In a turbine, the combination of a ring-supporting member provided with a laterally-projecting rib, a pair of rings for said member, and means for securing said rings one on each side of said rib, substantially as described.

29. In a turbine, the combination of a ring-supporting member provided with a series of concentric annular ribs, annular rings for said member, and means for securing said rings to the inner and outer peripheries of said ribs, substantially as described.

30. In a turbine, the combination of a ring-supporting member provided with a laterally-projecting annular rib and with a channel or groove adjacent to the base of said rib, a ring having one edge adapted to fit in said channel or groove, and means for securing the other edge to the free edge of the rib, substantially as described.

31. In a turbine the combination of a ring-supporting member having an annular rib projecting therefrom and provided with a groove or channel on each side of the base of said rib, rings adapted to fit against the inner and outer periphery of said rib and having each an edge adapted to fit in said groove or channel, and means for securing the other edges of said rings to the free edge of the rib, substantially as described.

32. In a turbine, the combination of a ring-supporting member having an annular rib projecting therefrom and provided with a groove or channel adjacent to the base of said rib, said groove or channel having a portion beveled toward said rib, a ring having one edge beveled to correspond to the beveled portion of said groove or channel, and means for securing the other edge of said ring to the free edge of the rib, substantially as described.

33. In a turbine, the combination of a ring-supporting member provided with an annular rib and having a channel or groove adjacent to each side of the base of the rib, said channel or groove having a portion beveled toward said rib, a pair of rings adapted to be secured to opposite peripheries of said rib and having each an edge beveled to correspond to the beveled portion of said groove, and means for securing the other edge of each of said rings to the free edge of the rib and for forcing said rings to their seats in said grooves or channels, substantially as described.

34. In a turbine, the combination of a ring-supporting member provided with an annular rib and having a channel or groove on each side of the base of said rib, a pair of rings adapted to be secured adjacent to the opposite peripheries of said rib, with an edge fitting in the appropriate channel adjacent thereto, a clamping-ring intermediate of the other edges of said rings and bearing against said rings, and means for securing said clamping-ring to the free edge of said rib, substantially as described.

35. In a turbine, the combination of a ring-supporting member provided with an annular rib, a ring having one edge fitting against said member at the base of said rib and having a shoulder adjacent to the other edge extending slightly beyond said rib, and a clamping-ring adapted to be secured to the outer edge of said rib and to bear against said shoulder, substantially as described.

36. In a turbine, the combination of a ring-supporting member provided with an annular rib, a pair of rings provided each with an edge adapted to bear against said member adjacent to opposite peripheries of said rib and with an edge extending beyond the free edge of the rib and with oppositely-directed shoulders extending slightly beyond the free edge of said rib, a clamping-ring adapted to fit between the outer edges of said rings and to bear against said shoulders, and means for securing said clamping-ring to said rib, substantially as described.

37. In a turbine, the combination of a ring-supporting member provided with an annular rib and a channel or groove adjacent to the base of said rib, a ring provided with an edge adapted to fit in said channel or groove and with a shoulder adjacent to the other edge thereof, and a clamping-ring adapted to be secured to the outer edge of said rib and to bear against the shoulder of the other ring, substantially as described.

38. In a turbine, the combination of a ring-supporting member provided with an annular rib and a channel or groove adjacent to each side of the base of said rib, a pair of rings provided each with an edge adapted to fit in one of said grooves or channels and with an edge extending slightly beyond the free edge of the rib, and with oppositely-directed shoulders extending slightly beyond the free edge of said rib, a clamping-ring adapted to fit between the outer edges of said rings and to bear against said shoulders, and means for securing said clamping-ring to said rib, substantially as described.

39. In a turbine, the combination of a shaft, a blade-carrying ring exterior to said shaft, and a cylindrical ring interposed between and spaced from said ring and said shaft, whereby the shaft is protected from the heat of radiation of the turbine, substantially as described.

40. In a turbine, the combination of a shaft, a pair of blade-carrying rings exterior to said shaft provided with interlocking meeting edges and with inwardly-projecting shoulders and forming a continuous annulus, a cylindrical ring interposed between said pair of rings and said shaft and fitting between the shoulders of said rings, and means intermediate of said cylindrical ring and shaft for clamping together said blade-carrying rings, substantially as described.

41. In a turbine, the combination of a shaft, a pair of oppositely-facing disks rigidly mounted on said shaft, a pair of blade-carrying rings exterior to said shaft, carried by said disks and provided with interlocking meeting edges and with inwardly-projecting shoulders, a cylindrical ring interposed between said pair of rings and said shaft and fitting between the shoulders of the rings, through-bolts extending through said disks and located intermediately of said cylindrical ring and said shaft, substantially as described.

42. In a turbine, the combination of a pair of concentric fixed rings provided with rows of oppositely-projecting buckets extending only partly around the periphery thereof, means for filling the space between the ends of each row of buckets, and a runner-ring interposed between said fixed rings and having on its inner and outer peripheries continuous rows of blades alternating with the rows of buckets on the inner and the outer fixed ring respectively, substantially as described.

43. In a turbine, the combination of a radial series of communicating turbine-chambers, each of said chambers extending axially of the turbine and being of uniform depth throughout its length and increasing in width from the inlet to the outlet thereof, and means for supplying pressure fluid to said chambers, substantially as described.

44. In a turbine, the combination of a radial series of communicating turbine-chambers, each of said chambers extending axially of the turbine and being of uniform depth throughout its length and increasing in width from the inlet to the outlet, the said chambers progressively increasing in area from the inlet to the outlet of the turbine, and means for placing the smallest of said chambers in communication with the inlet to the turbine, substantially as described.

45. In a turbine, the combination of a series of concentric annular fixed rings, each provided with a series of circumferential rows of buckets extending only partly around its periphery, means for filling the space between the ends of each row of buckets, runner-rings coöperating with said fixed rings and said filling means to confine the pressure fluid to the bucket-provided portion of said fixed rings, the bucket-provided portion of the fixed rings increasing progressively from the innermost to the outermost ring, whereby the pressure fluid flowing through the turbine is permitted to expand progressively in its passage from the inlet to the outlet thereof, substantially as described.

46. In a turbine, the combination of a series of concentric annular fixed rings having each a series of circumferential rows of buckets extending partly around the periphery thereof, means for filling the space between the ends of each row of buckets, runner-rings coacting with said fixed rings to constitute, with said filling means, turbine-chambers corresponding to the bucket-provided portion of each ring, the buckets in each row of each fixed ring increasing progressively in number from the inlet to the outlet thereof and the bucket-provided portion of each ring progressively increasing from the inlet to the outlet of the turbine, substantially as described.

47. A turbine having in combination an inner high-pressure chamber and an outer low-pressure chamber, each of said chambers being provided with an independent contracted inlet and an independent contracted outlet, rows of blades located within said high-pressure chamber, one of said rows being adjacent to the outlet therefrom, rows of blades within said low-pressure chamber, the inlet to the low-pressure chamber being so located with respect to the outlet from the high-pressure chamber that the pressure fluid flows from the high-pressure chamber to the low-pressure chamber without altering the direction given to it by the blades adjacent to the outlet from the high-pressure chamber, substantially as described.

48. A runner-ring for turbines having circumferential grooves on the inner and outer periphery thereof and blades fitted in said grooves, substantially as described.

49. A turbine having in combination a series of annular runner-rings, each having on the inner and outer periphery thereof circumferential grooves, and blades fitted in said grooves, substantially as described.

50. In a turbine, the combination of a fixed member having a series of fixed rings each provided with a series of circumferential rows of buckets extending partly around the periphery thereof, filler-rings bridging the spaces between the ends of the rows of buckets, a movable member adjacent to the free edges of said fixed rings and carrying a series of runner-rings, said runner-rings coacting with said fixed rings to confine the pressure fluid to the bucket-provided portion of the latter, and a flange projecting laterally from the free edge of each of said fixed rings toward and in close proximity to the basal portion of its adjacent runner-ring and having a cut-away portion corresponding to the bucket-provided portion of the fixed ring, the free edge of each of said fixed rings corresponding to said cut-away portion of the flange being cut down to permit the pressure fluid to issue thereover, substantially as described.

51. In a turbine, the combination of a fixed member carrying a ring, a movable member adjacent to the free edge of said ring and carrying a coöperating runner-ring, a clamping-ring adjacent to the movable member for clamping the fixed ring to its member, a portion of said clamping-ring being cut away to permit the pressure fluid to pass between said ring and the movable member, substantially as described.

52. In a turbine, the combination of a fixed member, a ring carried by said member and having a row of buckets extending only partly around its periphery, means for filling the space between the ends of said row of buckets, a ring clamping one edge of said ring to said fixed member, such clamping-ring being provided with a cut-away portion corresponding to the bucket-provided portion of the fixed ring, substantially as described.

53. In a turbine, the combination of a central hollow fixed member, provided on opposite faces thereof with fixed rings provided with buckets, disks within said casing one on each side of said central portion, provided with blade-carrying runner-rings, said runner-rings projecting into the spaces between the fixed rings, and radial ribs extending across the hollow portion of the fixed member and provided with passages placing in communication the spaces between the fixed rings, whereby the pressure on opposite sides of the turbine is equalized, substantially as described.

54. In a turbine, the combination of a central member provided with rings carrying blades, said rings extending from each side of said member, a member on each side of said central member having blade-carrying rings projecting into the spaces between the first-mentioned rings, and means for equalizing the pressure between the corresponding spaces on the opposite sides of said central member, substantially as described.

55. In a turbine, the combination of a fixed member having an annular rib thereon, a pair of fixed rings adjacent to the inner and outer periphery of said rib each fixed ring being provided with a row of buckets extending only partly around its periphery and with means for filling the space between the ends of said row of buckets, a clamping-ring for securing the outer edges of said fixed rings to the outer edge of the rib, said clamping-ring having a cut-away portion corresponding to the rows of buckets on said fixed rings, and a movable member adjacent to said clamping-ring and forming with the cut-away portion thereof a channel for pressure fluid from one of said fixed rings to the other, substantially as described.

56. In a turbine, the combination of a fixed member having an annular rib thereon, a pair of fixed rings adjacent to the inner and outer periphery of said rib and having each in the exposed periphery thereof a passage of limited area for pressure fluid, a clamping-ring between the outer edges of said fixed rings securing the same to the free edge of the rib, said clamping-ring having a passage therethrough corresponding to and connecting the passages in the peripheries of the fixed rings, substantially as described.

57. In a turbine, the combination of a fixed member having an annular rib thereon, a pair of fixed rings adjacent to the inner and outer periphery of said rib and having each in the exposed periphery thereof a passage of limited area for pressure fluid and a flange projecting laterally from the outer edge thereof, said flange being cut away to provide a continuation of the passage through its ring, a clamping-ring between the outer edges of said fixed rings and securing said rings to the rib, said clamping-ring being provided with a cut-away portion corresponding to the cut-away portions of the flanges whereby a passage is provided between the passages through said fixed rings, substantially as described.

58. In a turbine, the combination of a fixed member having an annular rib thereon, a pair of fixed rings adjacent to the inner and outer periphery of said rib and having each on the exposed periphery thereof a series of rows of buckets extending only partly around the periphery and means for filling the spaces between the ends of each row of buckets, a lateral flange projecting from the outer edge of each of said rings, said flange having a cut-away portion corresponding to the bucket-provided portion of its ring, a clamping-ring intermediate of the outer edges of said fixed rings for securing them to the rib, said clamping-ring having a passage therethrough corresponding to the cut-away portions of the flanges, and a movable member adjacent to the outer edges of said rings and provided with runner-rings having rows of blades coacting with the row of buckets, substantially as described.

59. In a turbine, the combination of a fixed member having thereon a ring, a row of buckets on said ring extending only partly around the periphery thereof, means for filling the space between the ends of said row, a runner-ring coöperating with said fixed ring to form with the bucket-provided portion of the same a turbine-chamber, said runner-ring being provided with a row of blades adjacent to the row of buckets and on the discharge side of the said turbine-chamber, a clamping-ring exterior to the outlet from the turbine-chamber and provided with a channel corresponding to said chamber, the walls of said channel being inclined to correspond to the direction given the pressure fluid by the blades on the runner-ring, substantially as described.

60. In a turbine, the combination of a fixed member, of a pair of rings each having an edge thereof bearing against said member, a series of rows of buckets extending only partly around the periphery thereof and means for filling the space between the ends of each row of buckets, a movable member provided with runner-rings coöperating with said fixed rings to form with the bucket-provided portions thereof high and low pressure turbine-chambers, said runner-rings being provided with rows of blades corresponding to the rows of buckets on the fixed rings, the last row of blades in the high-pressure chamber being located between the last row of buckets and the discharge-outlet from said chamber, and a clamping-ring for the outer edges of said fixed rings, said clamping-ring being provided with a channel therethrough to establish communication between said turbine-chambers, the walls of the channel being inclined to correspond to the direction given the pressure fluid by the blades on the runner-ring as it passes to said channel from the high-pressure turbine-chamber, substantially as described.

61. In a turbine, the combination of a fixed member, of a pair of rings each having an edge bearing against said member, a series of rows of buckets extending only partly around the periphery thereof, means for filling the space between the ends of each row of buckets, and a lateral flange having a cut-away portion corresponding to the bucket-provided portion of its ring, a movable member provided with runner-rings coöperating with said fixed rings to form with the bucket-provided portions thereof high and low pressure turbine-chambers, said runner-rings being provided with rows of blades corresponding to the rows of buckets on the fixed rings, the last row of blades in the high-pressure chamber being located between the last row of buckets and the discharge-outlet from said chamber, and a clamping-ring for the outer edges of said fixed rings, said clamping-ring being provided with a channel therethrough to establish communication between said turbine-chambers, the walls of the channel being inclined to correspond to the direction given the pressure fluid by the blades on the runner-ring as it passes to said channel from the high-pressure chamber and extending from the ends of the flanges on one of said fixed rings to the corresponding ends of the flanges on the other, substantially as described.

62. In a turbine, the combination of inner and outer fixed rings having each a series of rows of buckets extending only partly around the periphery thereof, means comprising runner-rings for confining pressure fluid to the bucket-provided portion of each of said fixed rings thereby forming in each of said fixed rings an axial turbine-chamber, rows of blades carried by said runner-rings, the row adjacent to the outlet of the inner ring being located between said outlet and the last row of buckets, and the inlet to the outer turbine-chamber being out of radial alinement with the outlet from the inner chamber to permit the pressure fluid to flow thereto without altering the direction given to it by the last row of blades in the preceding chamber, substantially as described.

63. In a turbine, the combination of a fixed member, a pair of fixed rings having each an edge carried by said fixed member, a clamping-ring passing between and clamping together the other edges of said rings and substantially flush therewith, buckets carried by each of said fixed rings and extending only partly around the periphery thereof, means, comprising a pair of runner-rings, for forming with the bucket-provided portion of each of said rings an axial turbine-chamber, a row of blades carried by the runner-ring of the high-pressure turbine-chamber between the buckets and the outlet from said chamber, the inlet to the low-pressure chamber being out of radial alinement with the outlet from the high-pressure chamber to correspond to the direction given to the pressure fluid by the said row of blades in the outlet from the high-pressure chamber, a connecting-passage being formed, through the clamping-ring, from the outlet of the high-pressure chamber to the inlet to the low-pressure chamber, substantially as described.

64. In a turbine, the combination of a pair of fixed rings provided each with rows of buckets extending partly around the periphery thereof, the end of one row overlapping the corresponding end of the following row progressively through said rings from the inlet to the outlet thereof, means for confining the pressure fluid to the bucket-provided portion of each of said rings, a lateral flange on the outlet end of one of said rings, a lateral flange on the inlet end of the other ring, said flanges having each a cut-away portion corresponding to the bucket-provided portion of the ring, an end wall of the flange on the outlet end of one of the rings overlapping the corresponding end of the last row of buckets in said ring and the end walls of the flange on the other ring being flush with the ends of the first row of buckets in said ring, substantially as described.

65. In a turbine, the combination of inner and outer fixed rings having each a series of rows of buckets extending only partly around the periphery thereof, means, comprising runner-rings, for confining the pressure fluid to the bucket-provided portion of each of said fixed rings to form turbine-chamber therewith, a lateral flange on the outlet end of one of said fixed rings, a lateral flange on the inlet end of the other of said fixed rings, said flanges having each a cut-away portion corresponding to the bucket-provided portion of its ring and the end of each of said rings corresponding to said cut-away portion being cut down to form a passage for pressure fluid, a row of blades interposed between the last row of buckets of the inner ring and the outlet therefrom, a clamping-ring extending around the fixed rings between the flanges thereof, said clamping-ring being cut away to correspond to the cut-away portions of the ends of said fixed rings, the passage through said fixed and clamping rings being inclined to correspond to the direction given to the pressure fluid by the blades of the runner-ring as it is discharged from the inner turbine-chamber, and such chambers being out of radial alinement, substantially as described.

66. A ring for turbines constructed of large sections and a relatively smaller section, the ring being cut through in a radial direction between adjacent large sections and being cut at an inclination to such radial direction between the large sections and the smaller section, the cuts between the large and smaller sections being parallel, substantially as described.

67. In a turbine, the combination of a member, an annular rib projecting from said member and a ring applied to the inner periphery of said rib, said ring being constructed of large sections and a relatively smaller section, the ring being cut through in a radial direction between adjacent large sections and being cut at an inclination to such radial direction between the large sections and the smaller section, the cuts between the large and smaller sections being parallel, substantially as described.

68. In a turbine, the combination of a fixed member having a series of fixed rings each provided with a series of circumferential rows of buckets extending partly around the periphery thereof, filler-rings bridging the spaces between the ends of the rows of buckets, a movable member adjacent to the free edges of said fixed rings and carrying a series of runner-rings, said runner-rings coacting with said fixed rings to confine the pressure fluid to the bucket-provided portion of the latter, and a flange projecting laterally from the free edge of each of said fixed rings toward and in close proximity to the basal portion of its adjacent runner-ring and having a cut-away portion corresponding to the bucket-provided portion of the fixed ring, substantially as described.

69. In a turbine, the combination of a central member having rings in its opposite faces, a member on each side of said central member having rings projecting into the spaces between the rings on the central member and forming therewith turbine-chambers, there being passages extending through said central member and establishing communication between the chambers on opposite sides of said member, substantially as described.

In testimony whereof I hereunto affix my signature in the presence of two witnesses.

EDWARD CHESHIRE.

Witnesses:
H. D. STAAB,
WM. SMITH.